UNITED STATES PATENT OFFICE.

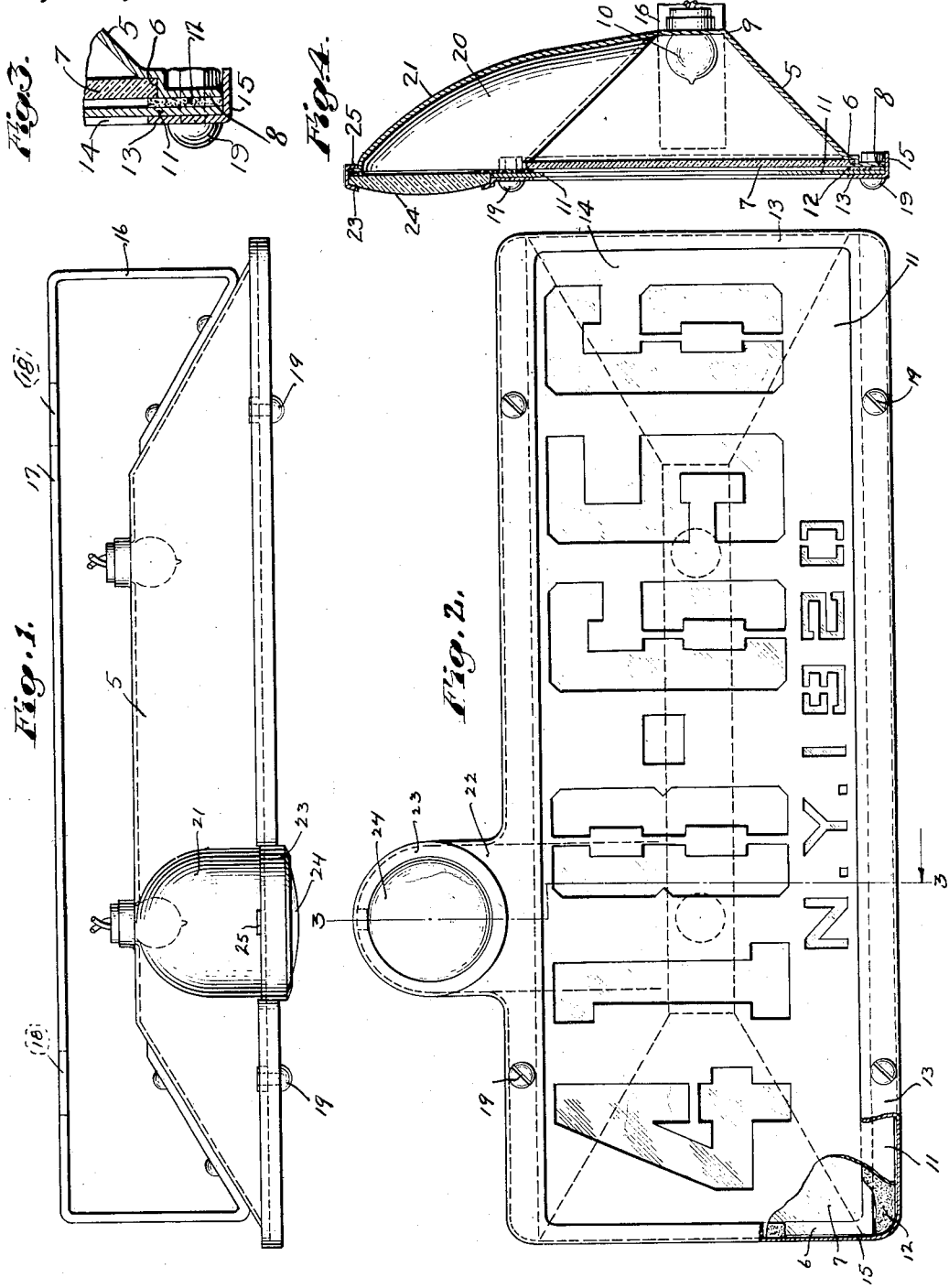

HAROLD E. ROBINSON AND RAYMOND M. VAN CLEVE, OF LOCKPORT, NEW YORK.

DISPLAY DEVICE FOR AUTOMOBILE LICENSE-PLATES.

1,393,971.

Specification of Letters Patent.  Patented Oct. 18, 1921.

Application filed December 27, 1920. Serial No. 433,309.

*To all whom it may concern:*

Be it known that we, HAROLD E. ROBINSON and RAYMOND M. VAN CLEVE, citizens of the United States of America, and residents of the city of Lockport, county of Niagara, and State of New York, have invented certain new and useful Improvements in Display Devices for Automobile License-Plates, of which the following is a full, clear, and exact description.

Our invention relates generally to display devices, and more particularly to that type of device which is used in displaying automobile license plates having the numbers and letters thereof perforated; the device being provided with illuminating means behind the plate, whereby it shall be rendered more clearly visible.

The principal object of our invention has been to provide a display device of this nature having a casing preferably of one-piece construction, and of simple design.

Another object has been to provide simple means for retaining the license plate and glass in place.

Furthermore, our invention is preferably provided with a tail lamp, which receives its illumination from the same bulb or bulbs which provide illumination for the license plate.

The above objects and advantages have been accomplished by the device shown in the accompanying drawings, of which:

Figure 1 is a plan view of our device.

Fig. 2 is a face view of our device.

Fig. 3 is an enlarged, fragmentary view of the parts shown in the lower portion of Fig. 4.

Fig. 4 is a sectional view taken on line 3—3 of Fig. 2.

In the drawings, 5 represents the casing of our device which is preferably of cone-frustum shape and made of a single piece of material. The casing is formed near its outer edge with a recess 6 for the reception of a cover glass 7. The outer edge portions 8 of the casing are bent outwardly so as to lie in parallel relation with, and preferably on the same plane as, the outer surface of the cover glass 7. The recess 6 is preferably of a depth equal to the thickness of the glass 7, so that the pressure of the fastening means for the license plate will not bear directly upon the glass, thereby preventing the breakage of the glass from undue pressure. Arranged in the rear wall 9 of the casing are preferably two electric bulbs 10 which are secured in any well known form of socket, fastened in the wall. These electric bulbs are arranged so as to give the best distribution of illumination over the glass 7. So as to increase the illuminating effect of the electric bulbs 10, the inner surfaces of the casing are preferably plated so as to act as reflectors.

11 is the license plate bearing the license number. The figures of the number in the plate are cut through the metal forming the plate so that light may be transmitted therethrough. This plate is located on top of the glass 7 with a suitable resilient washer 12 arranged therebetween. 13 is the cover of the casing which is provided with a central opening 14 large enough to expose all the figures and letters of the license plate. This cover is provided with a depending flange 15 which takes over the license plate and the outwardly extending edge portions 8. A plurality of bolts 19 are passed through the cover, license plate and edge portions 8 of the casing. Secured to the rear of the casing 5 is a bracket 16. This bracket is provided in the portions 17 with two elongated openings 18, whereby our device may be conveniently fastened in place.

When it is desired to provide a tail lamp with our invention, a compartment 20 is formed in the casing 5 and preferably at the point where one of the electric bulbs 10 is located. The wall 21 of this compartment extends upwardly and is flanged outwardly in a similar manner to the edge portions 8 of the main part of the casing. The cover 13 of the device is provided with an upwardly extending portion 22, designed to receive a tail lamp glass 24. The tail lamp glass is put in place from the inside face of the cover; and, when the cover is put in position, the glass 24 will be held against the flanged portion of the wall 21, with a suitable interposed gasket. A tab 25 is provided on the flange 23 and extends rearwardly therefrom at a point at or near the top thereof. When the cover is fastened in position, this tab is bent downwardly and in engagement with the rear face of the flanged portion of the wall 21, thereby securely holding the tail lamp flange 23 in position against the casing of the device. The wall 21 of the compartment 20 is so designed that the light from the electric bulb over which it is placed will be reflected through the glass 24, without the provision of a separate electric bulb for the tail lamp.

Obviously, some modifications of the details herein shown and described may be made without departing from the spirit of the invention or the scope of the appended claims; and, we do not, therefore, wish to be limited to the exact embodiment herein shown and described, the form described being merely a preferred embodiment thereof.

Having thus described our invention, what we claim is:

1. A display device characterized by having a one-piece casing forming a reflector and provided with a recess near its outer edge for the reception of a cover glass, a bracket carried by and in interspaced relation with the casing, a cover for the casing, the cover being formed with a central opening and a depending flange for taking over the license plate and the casing, and fastening means for securing the cover and license plate to the casing.

2. A display device characterized by having a one-piece casing forming a reflector and provided with a recess near its outer edge for the reception of a cover glass, a bracket carried by and in interspaced relation with the casing, edge portions formed on the casing at such an elevation that they lie at substantially the same elevation as the top of the cover glass, a cover for the casing, the cover being formed with a central opening and a depending flange for taking over the license plate and edge portions of the casing, and fastening means for securing the cover and license plate to the casing.

3. A display device characterized by having a one-piece casing forming a reflector and provided with a recess near its outer edge for the reception of a cover glass, a cover for the casing, the cover being formed with a central opening and a depending flange for taking over the license plate and the casing, fastening means for securing the cover and license plate to the casing, a tail lamp arranged above the license plate, a reflector provided by the casing for the tail lamp, and means for fastening the glass of the tail lamp in place.

4. A display device characterized by having a one-piece casing forming a reflector and provided with a recess near its outer edge for the reception of a cover glass, edge portions formed on the casing at such an elevation that they lie at substantially the same elevation as the top of the cover glass, a cover for the casing, the cover being formed with a central opening and a depending flange for taking over the license plate and edge portions of the casing, fastening means for securing the cover and license plate to the casing, a tail lamp arranged above the license plate, a reflector provided by the casing for the tail lamp, and means for fastening the glass of the tail lamp in place.

5. A display device characterized by having a one-piece casing forming a reflector and provided with a recess near its outer edge for the reception of a cover glass, a cover for the casing, the cover being formed with a central opening and a depending flange for taking over the license plate and the casing, fastening means for securing the cover and license plate to the casing, a tail lamp arranged above the license plate, a reflector provided by the casing for the tail lamp, means for fastening the glass of the tail lamp in place, and means for illuminating the tail lamp and the license plate from a single source of illumination.

6. A display device characterized by having a one-piece casing forming a reflector and provided with a recess near its outer edge for the reception of a cover glass, a cover for the casing, the cover being formed with a central opening and a depending flange for taking over the license plate and the casing, fastening means for securing the cover and license plate to the casing, a tail lamp arranged above the license plate, a reflector provided by the casing for the tail lamp, and a flange formed in the cover for the tail lamp glass.

7. A display device characterized by having a one-piece casing formed with a recess near its outer edge for the reception of a cover glass, a cover for the casing, the cover being formed with a central opening and a depending flange for taking over the license plate and the casing, fastening means for securing the cover and license plate to the casing, a tail lamp arranged above the license plate, a reflector provided by the casing for the tail lamp, a flange formed in the cover for the tail lamp glass, and means for holding the tail lamp flange in place against the casing.

In testimony whereof, we have hereunto signed our names.

HAROLD E. ROBINSON.
RAYMOND M. VAN CLEVE.